W. W. Marsh,
Furnace-Grate Bar.
No. 30,074.   Patented Sep. 18, 1860.
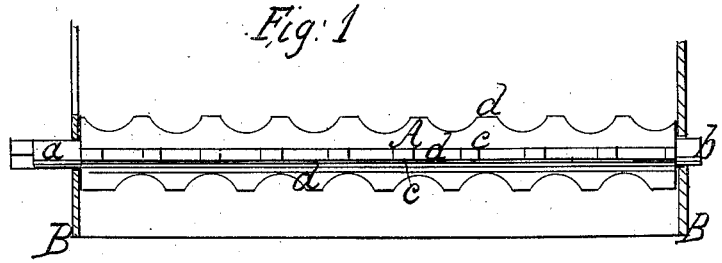
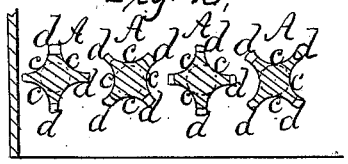
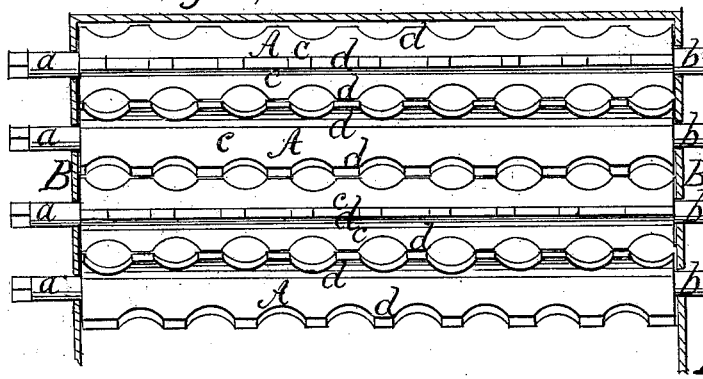
Witnesses;
Inventor
W W Marsh

UNITED STATES PATENT OFFICE.

W. W. MARSH, OF ALTON, ILLINOIS.

GRATE-BAR.

Specification of Letters Patent No. 30,074, dated September 18, 1860.

*To all whom it may concern:*

Be it known that I, W. W. MARSH, of Alton, in the county of Madison and State of Illinois, have invented a new and useful Improvement in Revolving or Rolling Grate-Bars for Furnaces and Stoves; and I do hereby declare that the following is a full, clear, and exact description of the same, reference being had to the accompanying drawings, forming part of this specification, in which—

Figure 1, is a longitudinal vertical section of a grate constructed according to my invention. Fig. 2, is a transverse vertical section of the same. Fig. 3 is a plan of the same.

Similar letters of reference indicate corresponding parts in the several figures.

To enable others skilled in the art to make and use my invention I will proceed to describe its construction and operation.

A, A, are the grate bars made with journals $a, a, b, b$, at their ends to fit to bearings in stationary transverse plates or supporting bars B, B, at each end of the grate. The journals $a, a$, at the front ends of the bars are made to project through the front of the furnace and squared at their ends to receive a socket wrench for the purpose of revolving or rocking them. Each bar contains an even number of longitudinal grooves $c, c$, and a corresponding number of intervening fins $d, d$, the number of grooves and fins in every bar being the same. By providing an even number of fins on each bar the fins are brought opposite each other so as to give a great depth of transverse section and thereby give great strength to the bar. By reference to Fig. 1, it will be observed that the fins have notches formed in them at regular distances and the projecting portions left between these notches constitute a series of teeth. The notches are so arranged upon the fins of each bar that the teeth on the several fins form a spiral series all around the bar as shown in Fig. 3.

By turning the bars by the socket wrench the dust and loose cinders are caused to work between them and the fins of one bar are caused so to work into the grooves of the bars on either side as to break up any clinkers that may be too large to work through the spaces without breaking, and in case of the clinkers jamming between the bars they will cause the bars to turn each other and so to crush the clinkers between them. This breaking of the clinkers is facilitated by the teeth and notches on the fins. The several bars may be geared together by spur gears at either or both ends so that by turning one by the wrench the whole may be caused to turn simultaneously, the arrangement of the bars in such case being such that the fins of each will work into the grooves of its next neighbors. By turning the bars half way around and letting them remain with the fins or sides downward which have been next the fire the cooling and contraction produced by the cold air below will cause the detachment of the clinkers.

I do not claim the invention of revolving or rolling grate bars, but

What I claim as my invention, and desire to secure by Letters Patent, is—

The construction of revolving grate bars with alternate longitudinal grooves and fins and a spiral transverse groove around each bar by which the edges of the fins are divided into notches and projections spirally arranged all as herein shown and described for the purpose set forth.

W. W. MARSH.

Witnesses:
JNO. H. BRUNER,
C. T. FRANCIS.